March 24, 1964   J. A. GAYLORD   3,125,790
RELEASABLE COUPLING
Filed June 12, 1961

INVENTOR.
JOHN A. GAYLORD
BY
ATTORNEY

United States Patent Office 3,125,790
Patented Mar. 24, 1964

3,125,790
RELEASABLE COUPLING
John A. Gaylord, San Rafael, Calif., assignor to H. Koch & Sons, Corte Madera, Calif., a corporation of California
Filed June 12, 1961, Ser. No. 116,339
6 Claims. (Cl. 24—201)

This invention relates to a releasable coupling.

An object of the invention is to provide a releasable coupling which can be coupled with reasonably slight effort and which will positively lock coupled elements together with a predetermined force. This type of coupling is particularly advantageous in situations where it is desirable to release at pulls of 25 pounds or under, but also provide for positive locking until such predetermined pull is applied.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts illustrated in the accompanying drawings.

With the foregoing and other objects in view, which will be made manifest in the following detailed description, reference is had to the accompanying drawings for the illustrative embodiment of the invention, wherein.

Figure 1:
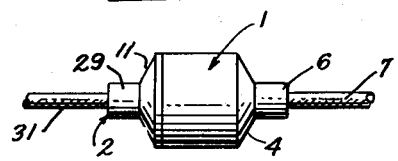
FIG. 1 is an outside view of the complete coupling.

In the illustrative embodiment of the invention shown in the drawings there is provided a female coupling member or receptacle 1 and a male coupling member or plug 2.

The coupling receptacle 1 includes a hollow cylindrical body 3 with a closed end 4 having a boss 6 thereon into which is secured fixedly a line, such a cable 7. Into the open end 8 of the hollow cylindrical body 3 is threadedly secured a guide plug 9. A head 11 on the outer end of the guide plug 9 is generally frusto-conical and its shoulder 12 abuts against the free end 13 of the end portion 8 of the cylindrical body 3. The guide plug 9 has a central hole 14 therethrough to accommodate the plug 2.

The inner face of the guide plug 9 is dished so as to provide a generally frusto-conical concave face 16. The dished inner end of the guide plug 9 is spaced from the bottom 17 of the hollow body 3.

In the generally cylindrical space of the hollow body 3 is positioned a cylindrical locking member or follower 18 which slidably fits in the hollow body 3 between the guide plug 9 and the bottom 17. This locking member 18 is narrower than the distance between the dished face 16 and the bottom 17. A frusto-conical dished face 19 is provided on the follower 18 facing the frusto-conical dished face 16 of the guide plug 9. A pocket 21 is formed in the back face of the follower 18 opposite the bottom 17 to nest a coil spring 22. This coil spring 22 bears against the bottom 17 and against the recessed back face of the follower 18 so as to urge said follower 18 toward the guide plug 9.

Figure 2:
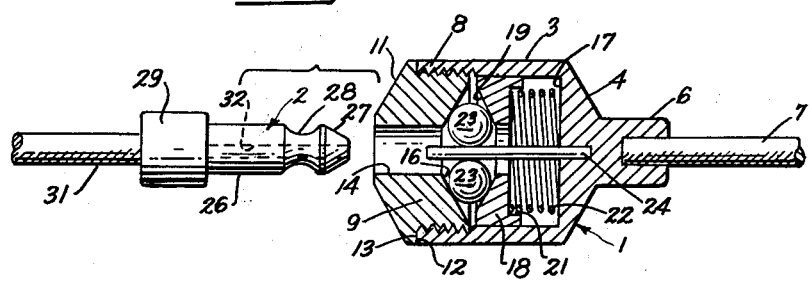
FIG. 2 is a developed view partly in section of the male coupling and the female coupling.

Between the complemental frusto-conical dished faces 16 and 19 are a plurality of balls 23 of such size as to slightly space the follower 18 from the guide plug 9 in the released position as shown in FIG. 2. Thus the guide plug 9 and the follower 18 form bearing members for the balls 23. A pin 24 is fixedly secured in the closed end 4 of the hollow body 3 and extends coaxially in the same so as to project partially into the central passage 14 of the guide plug 9. This pin 24 spaces the balls 23 apart in the collapsed or released position shown in FIG. 2. The pin 24 is also utilized as a guide for the male coupling plug 2 as hereinafter described.

Figure 3:
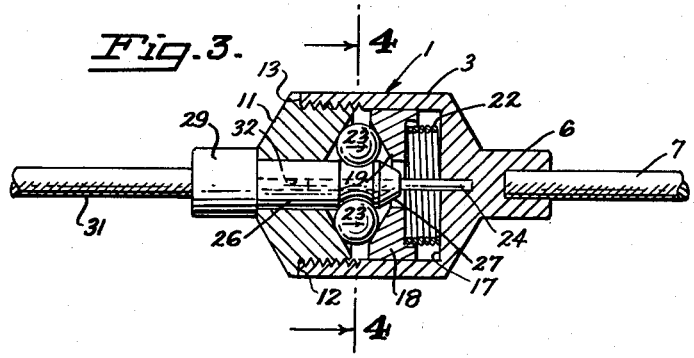
FIG. 3 is a partly sectional view showing the coupling locked.
Figure 4:
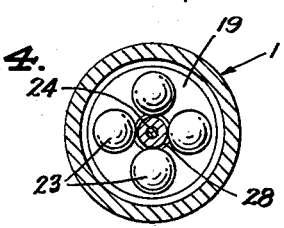
FIG. 4 is a partly cross-sectional view, the section being taken substantially on the lines 4—4 of FIG. 3.

The coupling plug 2 includes a generally cylindrical stem 26 which has a frusto-conical entrance tip 27. At the base of the frusto-conical tip 27 is an annular groove 28 which is dished arcuately so as to generally correspond to the radii of the balls 23. A collar 29 on the stem 26 is spaced from the end groove 28 such a distance that the collar 29 abuts the outer end of the guide plug 9 when the balls 23 are nested in the groove 28, as shown in FIG. 3. A suitable line such as a cable 31 is fixedly secured in the collar 29 to be coupled by the device to the other cable 7. A central hole 32 extends from the tip 27 of the coupling plug 2 inwardly and fits over the free end of a pin 24 as shown in FIG. 3.

In operation the coupling is quickly coupled by inserting the coupling plug 2 through the passage 14 and over the pin 24. The entrance tip 27 is so tapered that it engages the inside portions of the balls 23 and pushes them outwardly. The force thus applied to the balls 23 forces the balls 23 outwardly and as the balls 23 are bearing against the frusto-conical dished faces 16 and 19 the follower 18 is pushed against the action of the spring 22 toward the bottom 7 until the balls 23 pass over the base of the frusto-conical tip 27 and nest in the groove 28 in the manner shown in FIG. 3. The spring 22 holds the balls 23 in such coupling locking position and thereby accomplishes a firm coupling in accordance with the tension of the coil spring 22.

In order to release the coupling a pull has to be applied as predetermined by the tension of the spring 22, and transmitted through the balls 23 to the cam face 19 of the follower 18 so as to push the follower 18 away from the guide plug 9. In the herein embodiment the spring tension is adjusted to release at a predetermined force of 25 lbs., or less if needed. The spring tension may be adjusted by unscrewing the plug 9, thereby permitting the expansion of the spring in the initial position and thereby reducing the compression of the spring in the coupling position, inasmuch as the respective positions of the follower 18 are correspondingly changed. Pull is exerted by pulling the collar 29 and holding the hollow coupling body 3 so as to pull the elements apart. As sufficient pull is exerted the balls 23 are pressed outward between the cammed faces 16 and 19 and push the follower 18 against the action of the spring 17 so as to permit the withdrawal of the coupling plug 2 from the female coupling 3, as shown in FIG. 2.

I claim:

1. In a coupling device of the character described, a female coupling member, a male coupling member insertable into the female coupling member, a pair of relatively slidable bearing members in the female coupling member, resiliently yieldable means in said female member to urge said bearing members together, a plurality of balls between said bearing members engaging said male coupling member, means on said male coupling member co-acting with said balls to lock said male coupling member to said balls, an element on said male coupling member adjacent said means to move said balls away from said male coupling member when said male coupling member is pulled out of said female coupling member, coacting faces on said bearing members holding said balls in engagement with said means and converting the force applied to said balls by the pulling of said male coupling member into axial force to push said bearing members apart against the action of said resiliently yieldable means for releasing said male coupling member upon a predetermined relative pull on said coupling members, means on said male coupling member to limit the insertion of said male coupling member into the female coupling member to a position where said balls are interlocked with said locking means, and means in said female coupling member to space said balls apart in the loose position and to guide said male coupling member substantially centrally between said balls.

2. In a coupling device of the character described a female coupling member, a male coupling member insertable in the female coupling member, said female coupling member including a hollow body, an end of the hollow body being adapted to be connected to another object to be coupled, a pair of opposite bearing members transversely positioned in said body, one of said bearing members being slidable in said body axially with respect to said male coupling member, resiliently yieldable means to urge said bearing members toward one another, a plurality of balls between said bearing members engaging and locking said male coupling member in said female coupling member, said male coupling member including a plug for insertion into the female coupling member, an element on the plug for connection to an object to be coupled, an enlarged element on the plug insertable beyond the balls in said female coupling member for pushing the balls outwardly as the plug is pulled out of said female coupling member; cam means on the face of at least one of said bearing members coacting with said balls normally to hold said balls in locking engagement with said plug and to convert the force of said outward pushing of said balls axially relatively to said bearing members to push said bearing members apart against the action of said resiliently yieldable means, the other of said bearing members being adjustably secured in said female coupling member so as to adjust the tension of said resiliently yieldable means.

3. In a coupling device of the character described a female coupling member, a male coupling member insertable in the female coupling member, said female coupling member including a hollow body, an end of the hollow body being adapted to be connected to another object to be coupled, a pair of opposite bearing members transversely positioned in said body, at least one of said bearing members being slidable in said body axially with respect to said male coupling member, resiliently yieldable means to urge said bearing members toward one another, a plurality of balls between said bearing members engaging and locking said male coupling member in said female coupling member, said male coupling member including a plug for insertion into the female coupling member, an element on the plug for connection to an object to be coupled, an enlarged element on the plug insertable beyond the balls in said female coupling member for pushing the balls outwardly as the plug is pulled out of said female coupling member; cam means on the face of at least one of said bearing members coacting with said balls normally to hold said balls in locking engagement with said plug and to convert the force of said outward pushing of said balls axially relatively to said bearing members to push said bearing members apart against the action of said resiliently yieldable means, and means on said plug to limit the insertion of said plug into said female coupling member to a position where said balls are in coupling engagement with said plug, means in said female coupling member to space the balls apart in the loose position and to guide said plug substantially centrally between said balls.

4. A coupling device comprising a female coupling member and a plug, said coupling member being hollow, means at one end of said member to secure said member to an object to be coupled, guiding means on the other end of said member for said plug, a plurality of balls in said hollow member, a follower movable in said female coupling member, said guiding means and said follower having concave frusto-conical dished faces diverging toward the center of the female coupling member, and resiliently yieldable means urging said follower against said balls so as to force said balls into locking engagement with said plug, said guiding means being adjustably secured in said hollow female coupling member for predetermining the initial tension of said resiliently yieldable means.

5. A coupling device defined in claim 4, and nesting means on said plug to nest said balls in said locking engagement, and an element on said plug beyond said nesting means to push said balls away from said nesting means as said plug is pulled out of said member by a pulling force sufficient to overcome the action of said resiliently yielding means, and means in said female coupling member to space the balls apart in the loose position and to guide said plug substantially centrally between said balls.

6. A coupling device comprising a hollow body, an end of the hollow body being adapted to be connected to an object to be coupled, a plug insertable in the other end of said body and being adapted to be connected to another object to be coupled with said first object; a plug guide adjustably secured in said other end of said body, being spaced from said first mentioned end of said body, a spring pressed follower movable in said body axially opposite said plug guide, a plurality of balls between said plug guide and said follower, a cam face on said follower urging said balls toward the axis of said body; nesting socket means on said plug engaged by said balls for coupling the plug with said body, and an enlarged tip on said plug beyond said nesting sockets to push said balls out of said sockets when the pull on said plug overcomes the urging force of said spring pressed follower.

References Cited in the file of this patent

UNITED STATES PATENTS

| | | |
|---|---|---|
| 845,654 | Layng | Feb. 26, 1907 |
| 860,679 | Lewis | July 23, 1907 |
| 1,210,101 | Spillmann | Dec. 8, 1914 |
| 1,703,579 | Gaffner | Feb. 26, 1929 |
| 2,775,137 | Chung | Dec. 25, 1956 |
| 2,796,284 | Benson | June 18, 1957 |
| 2,971,776 | Charley | Feb. 14, 1961 |
| 3,044,813 | Affeldt | July 17, 1962 |

FOREIGN PATENTS

| | | |
|---|---|---|
| 158,734 | Germany | Mar. 1, 1905 |
| 895,334 | France | Jan. 22, 1945 |
| 460,296 | Canada | Oct. 11, 1949 |